United States Patent [19]

Brown

[11] Patent Number: 4,779,422

[45] Date of Patent: Oct. 25, 1988

[54] MASTER-CYLINDER-ACTUATED PLUNGER FOR HYDRAULIC BRAKE BOOSTER VALVE

[75] Inventor: George E. Brown, Niles, Mich.

[73] Assignee: Allied-Signal Inc., Morristown, N.J.

[21] Appl. No.: 56,078

[22] Filed: Jun. 1, 1987

[51] Int. Cl.⁴ .................. B60T 13/20; B60T 7/00; F15B 7/00
[52] U.S. Cl. .................................... 60/555; 60/557; 60/567; 60/581; 60/582; 91/460
[58] Field of Search .............. 60/548, 545, 555, 557, 60/558, 559, 561, 582, 581, 567; 91/460

[56] References Cited

U.S. PATENT DOCUMENTS

| | | | |
|---|---|---|---|
| 2,976,686 | 3/1961 | Stelzer | 60/555 X |
| 3,031,849 | 5/1962 | Price et al. | 60/558 X |
| 3,653,210 | 4/1972 | Mochizuku et al. | 60/557 |
| 3,677,002 | 7/1972 | Fulmer | 60/545 X |
| 4,034,566 | 7/1977 | Sukemoto et al. | 91/460 X |
| 4,475,336 | 10/1984 | Runkle | 60/545 |

FOREIGN PATENT DOCUMENTS

| | | | |
|---|---|---|---|
| 0127378 | 12/1984 | European Pat. Off. | 303/7 |
| 1134301 | 8/1962 | Fed. Rep. of Germany | |
| 2046012 | 6/1971 | Fed. Rep. of Germany | 303/115 |
| 2220407 | 10/1974 | France | 303/601 |
| 132668 | 11/1978 | Japan | 91/460 |

Primary Examiner—Robert E. Garrett
Assistant Examiner—George Kapsalas
Attorney, Agent, or Firm—Leo H. McCormick, Jr.; Ken C. Decker

[57] ABSTRACT

A brake system wherein an input from an operator operates a first master cylinder (12) produces first and second hydraulic fluid pressures. Flexible conduit (22 and 24) carries the first and second hydraulic fluid pressures to an actuator (26) for a hydraulic power booster (28). A plunger (58) in the actuator (26) reacts either to the first hydraulic fluid pressure or the second hydraulic fluid pressure by moving to operate the hydraulic power booster (28). Operation of the hydraulic power booster (28) provides an input force to develop first and second operation fluid pressures in a second master cylinder (30) to effect a brake application.

7 Claims, 3 Drawing Sheets

MASTER-CYLINDER-ACTUATED PLUNGER FOR HYDRAULIC BRAKE BOOSTER VALVE

BACKGROUND OF THE INVENTION

1. Field of the Invention

This invention relates to a hydraulic control mechanism for a brake system. A first master cylinder in response to an operator input supplies the hydraulic control mechanism with first and second hydraulic fluid pressure signals. When the first hydraulic fluid pressure signal is larger than or equal to the second hydraulic fluid pressure signal, the first hydraulic fluid pressure signal moves a plunger to operate a hydraulic booster, which in turn supplies an input to a second master cylinder to effect a brake application. When the first hydraulic fluid signal is smaller than the second hydraulic fluid signal, the second hydraulic fluid signal moves the plunger to effect the brake application.

2. Description of the Prior Art

Brake systems having a manually operated master cylinder and a power assisted hydraulic brake booster are not unusual for vehicles. Such systems have been used on trucks and an example of such a system is disclosed in U.S. Pat. No. 2,997,850. In this type system, the power assist is achieved through a pressure differential generated between vacuum generated at the intake manifold of the operating engine and air. While internal combustion engines remain available for use in the trucking industry, it has been demonstrated that diesel engines are more economical. In order to use a vacuum brake booster with a diesel engine it is necessary to add a vacuum pump to the engine. As a result of the added cost, some vehicle manufactures have incorporated different brake systems in their trucks. In such systems, the size of the master cylinder and booster has utilized much of the space under the hood. Unfortunately in trucks commonly referred to a cab over design, this space is not available. In a cab over design, the cab is located over the engine and pivots to allow access to the engine. Presently remotely mounted boosters are typically actuated using a complex mechanical linkage connecting the brake pedal to the booster-master cylinder combination.

SUMMARY OF THE INVENTION

Most vehicles currently manufactured have hydraulic power assisted steering systems. The hydraulic power source for such steering systems can also be used to operate a brake booster. Thus the same power source can be used for both steering and brake systems. In combining the brake system with the steering system a first master cylinder is mounted on the firewall of the cab of the truck. This first master cylinder is connected by flexible conduits to an actuator mechanism of the hydraulic brake booster. The hydraulic brake booster being is remotely mounted on the vehicle and connected to a second master cylinder. The second master cylinder is connected to the wheel brakes of the vehicle.

The actuator mechanism for the hydraulic brake booster has a housing with a bore therein. A shuttle piston in the bore is located between a first port and a second port. The first port receives a first hydraulic pressure signal from the first master cylinder in response to an operator input while the second port receives a second hydraulic pressure signal. A plunger normally responds to the first hydraulic pressure signal and operates the hydraulic brake booster which in turn moves pistons in the second master cylinder to effect a brake application. Should the first hydraulic pressure signal be less than the second hydraulic pressure signal, the shuttle piston moves and supplies the plunger with an input force to operate the hydraulic brake booster and effect the brake application.

It is a further object of this invention to provide a brake system with an actuator mechanism which receives first and second hydraulic fluid pressure signals from a first master cylinder and selects the higher fluid pressure signal to operate a hydraulic brake booster connected to a second master cylinder for effecting a brake application.

It is an object of this invention to provide a remotely positioned brake booster-master cylinder arrangement with a hydraulic fluid input signal from a manually operated master cylinder mounted in the cab of the vehicle.

An advantage this brake system offers resides in the ability to position a compact first master cylinder on the firewall of a cab over vehicle and a large second master cylinder in a remote position on the vehicle. The first master cylinder is connected to the second master cylinder by a flexible connections which allows the first master cylinder to pivot with the firewall about the chassis of the vehicle while the actuator mechanism of the second master cylinder moves to effect a brake application.

These and other advantages should be apparent from reading thus specification while viewing the drawings wherein.

DETAILED DESCRIPTION OF THE PREFERRED EMBODIMENTS

Figure 1:
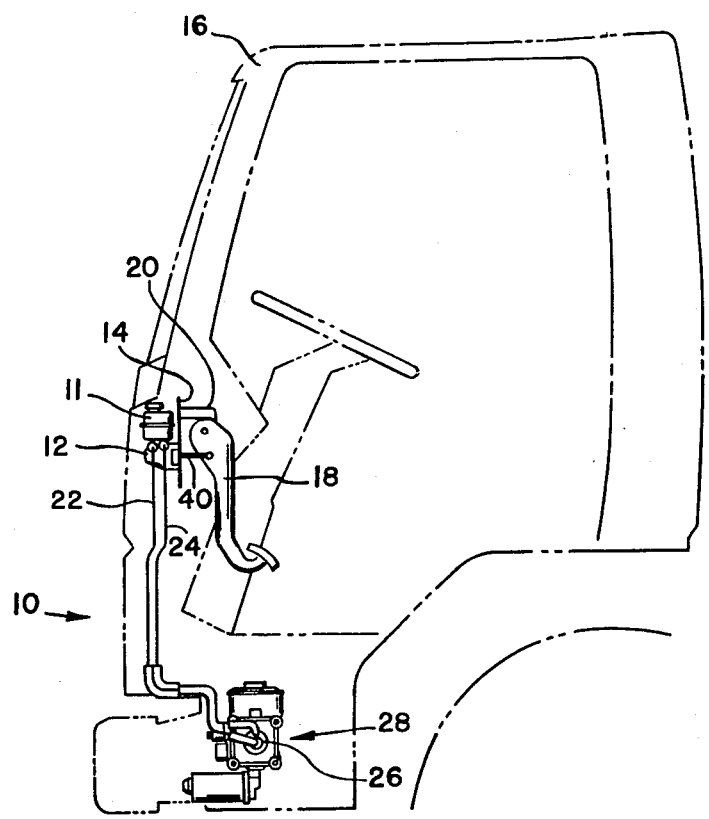
FIG. 1 is a schematic illustration of the brake system of this invention showing the installation in a cab located over the engine of a vehicle.
Figure 2:
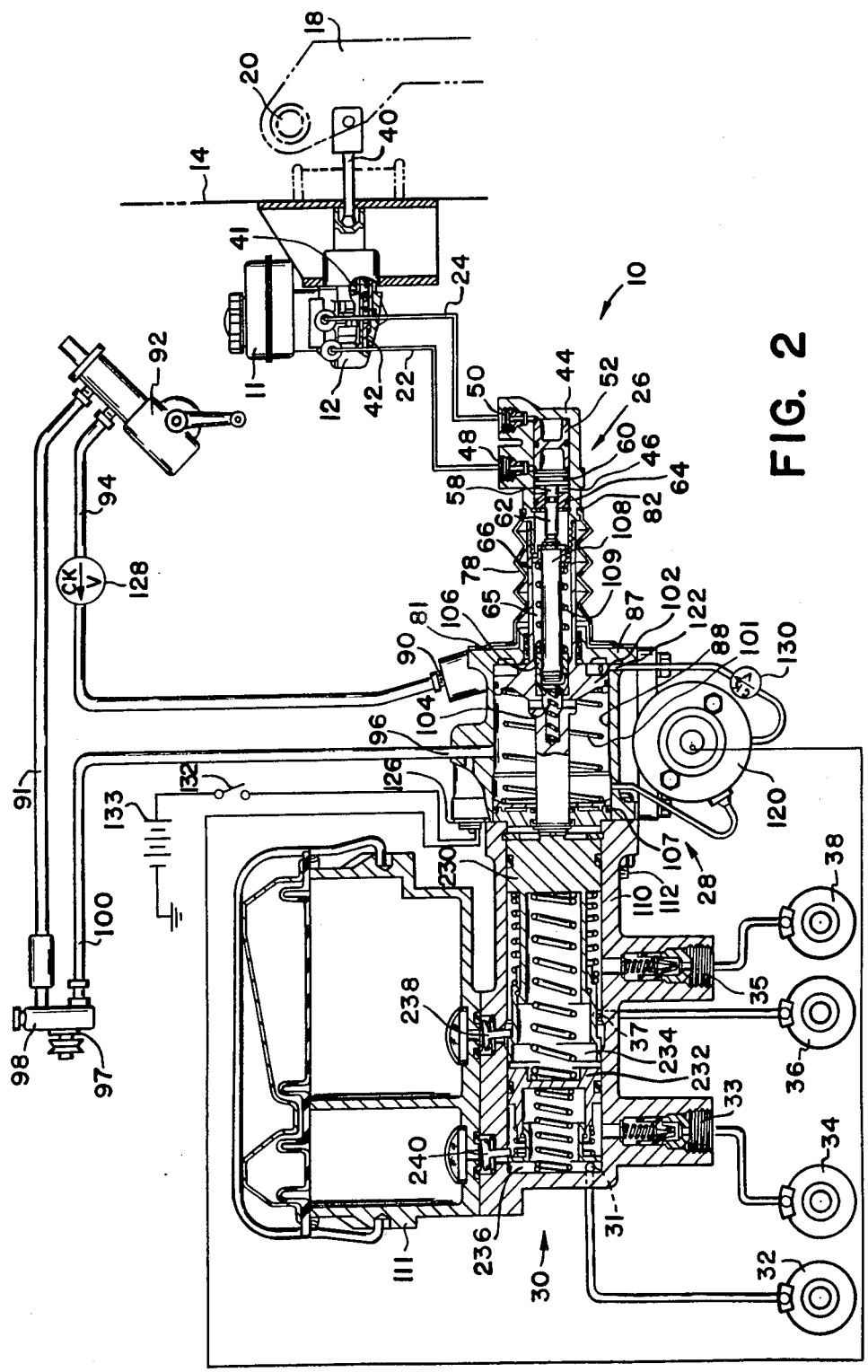
FIG. 2 is a schematic illustration showing the power brake booster connected to the power steering supply.

The hydraulic brake system 10 shown in FIG. 1 and 2 has a first master cylinder 12 located on the firwall 14 of a cab 16 mounted over the engine of a vehicle.

The master cylinder 12 is connected to pedal 18 mounted on a bracket 20 extending from firewall 14 and by flexible conduits 22 and 24 to an actuator mechanism 26 for a hydraulic brake booster 28. The hydraulic brake booster 28 is attached to a second master cylinder 30 which is connected to the front wheel brakes 32 and 34 and to the rear wheel brakes 36 and 38.

In response to an input applied by an operator to pedal 18, push rod 40 moves pistons 41 and 42 in master cylinder 12. Master cylinder 12 is of the type illustrated in U.S. Pat. No. 4,474,005 and as the pistons 41 and 42 therein move, first and second hydraulic fluid pressure signals are generated which are independently supplied through conduits 22 and 24 to actuator mechanism 26.

Figure 3:
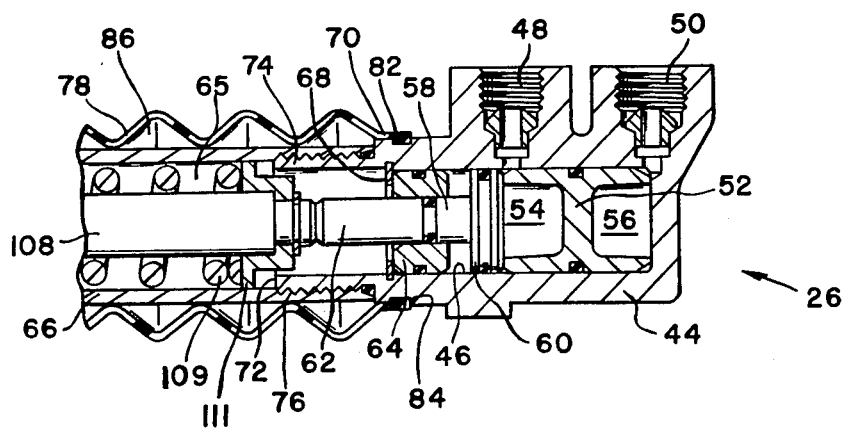
FIG. 3 is a sectional view of the actuator mechanism for the power brake booster.

The actuator mechanism 26 as shown in FIGS. 2 and 3 has a housing 44 with a bore 46 therein. Bore 46 has a first port 48 which is connected to flexible conduit 22 and a second port 50 which is connected to flexible conduit 24. A shuttle piston 52 is located in bore 46 and separates the first port 48 from the second port 50 to define chambers 54 and 56. A plunger 58 has a head 60 with a stem 62 that extends through a bearing seal 64 into housing 66 of booster 28. A ring 68 snaps into a groove 70 in bore 46 to retain bearing seal 64 in bore 46. The physical size or axial dimension of the bearing seal 64 sets the limit of the movement of head 60 of plunger 62 within bore 46. This axial dimension is dependent on and selected to match the stroke of the pistons in master cylinder 30. A cylindrical extension 72 from housing 44 has threads 74 that mate with threads 76 on housing 66 to attach actuation mechanism 26 to booster 28. A flexible boot 78 has a first end 81 that is attached to booster 28 and a second end 82 attached to housing 44 to form a sealed chamber 86 on the outside of the housing 66 of the booster 28.

Booster 28, is of the type disclosed in U.S. Pat. No. 3,967,536 which has a housing 87 with an internal bore 88. An inlet port 90 connects internal bore 88 to an open center power steering gear 92 through conduit 94 and while an outlet port 96 connects bore 87 to a reservoir 98 through conduit 100. A power piston 102 located in bore 88 has a passage 104 through which the inlet port 90 is connected to the outlet port 96. A valve mechanism 106 responsive to movement of push rod 108 by plunger 62 controls hydraulic flow through passage 104. Master cylinder 30 has a housing 110 that is attached to booster 28 by bolts 112, only one is shown. Master cylinder 30 which is of the type disclosed in U.S. Pat. No. 3,818,706 has individual outlet ports 31, 33, 35 and 37 connected to the corresponding wheel brakes 32, 34, 36 and 38 located on the vehicle.

Since master cylinder 30 is remotely located from the firewall 14, reservoir 111 has sufficient volume to assure that fluid is available for maintaining the operational fluid level in the brake lines for the truck.

METHOD OF OPERATION OF THE INVENTION

When the truck is not operating, it is necessary to provide an auxiliary power source for pressurizing the hydraulic fluid for the brake booster 28. The auxiliary power source is an electrical pump 120 which is connected to housing 87 through an inlet port 122 and an outlet port 124. The operation of the electrical pump is controlled by a pressure flow actuation switch 126 which is located in the hydraulic return conduit 100 of the steering system between booster 28 and pump reservoir 98. When the hydraulic fluid flow in the steering system is below a fixed level, switch 126 provides an actuation signal for activating the electric pump 120. A check valve 128 in conduit 94 prevents fluid from flowing to the power steering gear when electric pump 120 is operating in the same manner that check valve 130 prevents the flow of fluid to the electric pump when pump 97 is operating.

When the engine of the truck is stopped the electric pump 120 is in the off position. When an operator turns on the key, switch 132 is closed. If switch 126 does not detect a preset hydraulic fluid pressure, electrical energy is provided to pump 120. Thereafter, pump 120 is turned on and provides the hydraulic fluid pressure for the hydraulic power assist apparatus 28 sufficient to effect a brake application without the engine running. When the engine is started, the continuous flow from pump 97 thru power steering gear 92 is provided to booster 28 to develop the hydraulic power assist during brake application. When the outlet hydraulic pressure reaches the preset value as sensed by switch 126, electrical energy to pump 20 is terminated.

A brake application is initiated by an operator supplying a manual input to pedal 18. Movement of pedal 18 causes push rod 40 to move pistons 41 and 42. Movement of pistons 41 and 42 produces a first and second fluid pressures that are communicated to the first and second ports 48 and 50 in actuator mechanism 26. When the first hydraulic fluid pressure or operational signal as received in chamber 54 is larger than or equal to the second hydraulic fluid pressure or operational signal in chamber 56, the first hydraulic fluid pressure acts on head 60 to move plunger 58. Movement of plunger 58 is carried by stem 62 into push rod 108 which acts on spring 109 through collar 111 to position valve 106 such that the flow through passage 104 is restricted. Restriction of flow through passage 104 causes a pressure differential t o develop across piston 102 such that a force is produced that overcomes spring 101 to move pistons 230 and 232 in master cylinder 30 to pressurize fluid in chamber 234 and 236. Fluid pressure in chamber 234 is communicated to wheel brakes 36 and 38 through outlet ports 35 and 37 while the fluid pressure in chamber 236 is communicated to wheel brakes 32 and 34 through outlet ports 31 and 33 to effect a brake application.

Should the second hydraulic fluid pressure or operational signal from master cylinder 12 be larger than the first hydraulic fluid pressure or operational signal, a pressure differential develops across shuttle piston 52 and moves shuttle piston 52 toward and into engagement with head 60 to provide the actuation signal or force for moving push rod 108. Thereafter, the booster 28 operates in the same manner as when the first hydraulic fluid pressure from master cylinder 12 is the motive force. During the operation of booster 28, the operational pressure differential force that is produced across piston 102 is communicated to chamber 65 and acts on stem 62 to balance the operational signal from the first master cylinder 12.

Figure 4:
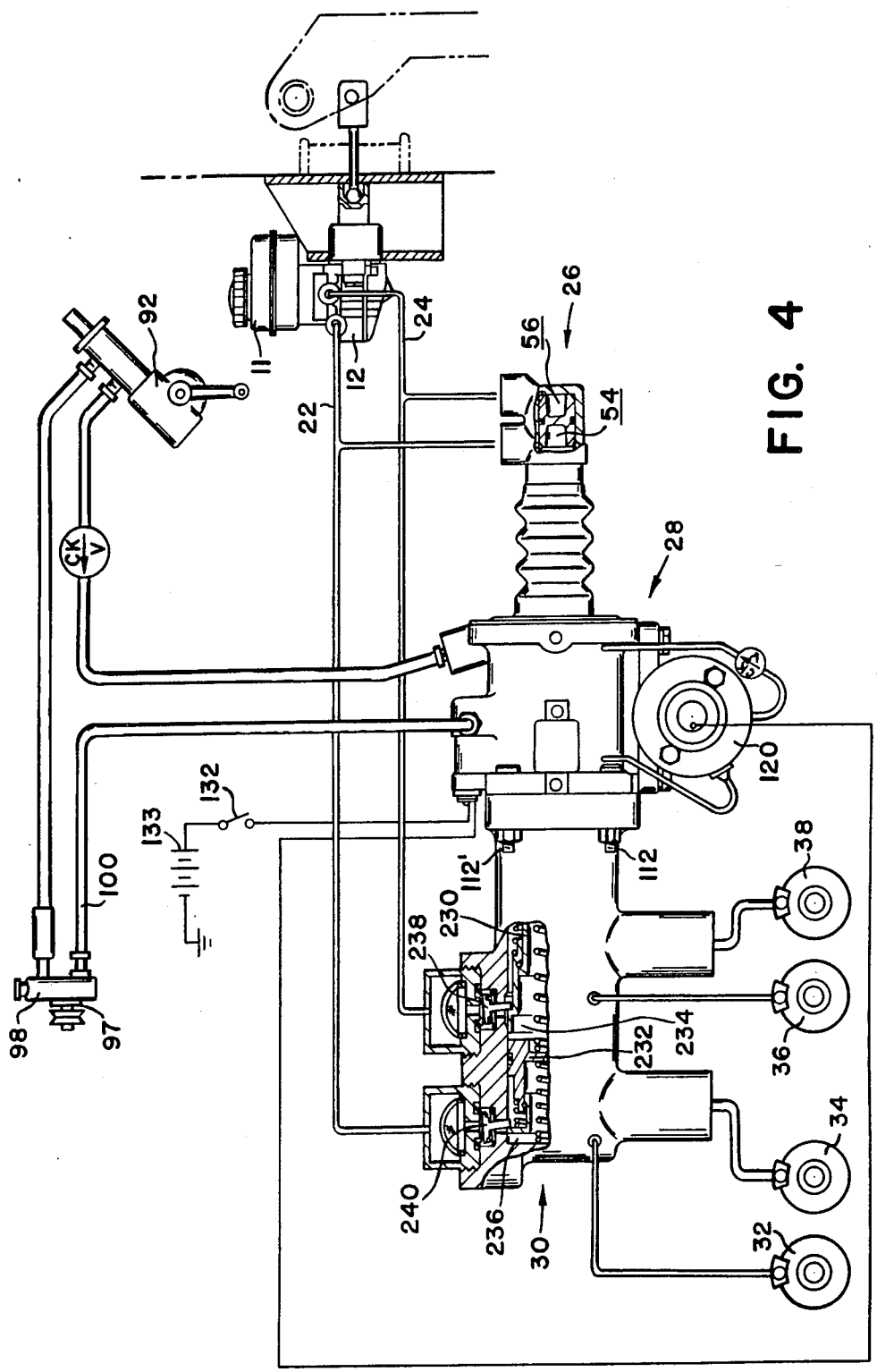
FIG. 4 is a schematic of a brake system having a first master cylinder connected to a second master cylinder and an actuator mechanism for a power brake booster.

The embodiment shown in FIG. 4 illustrates a secondary embodiment of the brake system where the first master cylinder 12 is connected to both the actuation mechanism 28 and the second master cylinder 30. In this embodiment, all compensation is through reservoir 11 of master cylinder 12. When the first and second hydraulic fluid pressure develops in master cylinder 12, it is simultaneously communicated to chambers 54 and 236, and 56 and 234. During normal operation, the fluid pressure supplied to the actuator mechanism 26 moves plunger 58 to activate booster 28. With booster 28 activated, piston 102 in booster 28 develops a force to move pistons 230 and 232. Movement of pistons 230 and 232 causes tilt valves 238 and 240 to close and interrupt direct communication between chambers 234 and 236 and the first master cylinder 12. However, should both the engine be off or pump 97 inoperative and the electrical energy source 133 to electric pump 120 be unavailable, the first and second hydraulic fluid pressure in conduits 22 and 24 that is supplied to chambers 234 and 236 is sufficient to provide some hydraulic fluid pressure to wheel brakes 32, 34, 36, and 38 to effect a brake application.

I claim:
1. A brake system comprising:
   a first master cylinder attached to the firewall of a vehicle, said first master cylinder having first and second pistons located in a bore therein;
   a brake pedal connected to said first master cylinder and responsive to an operator input for moving said first and second pistons to produce first and second hydraulic fluid pressures;

a second master cylinder remotely positioned from said first master cylinder and connected to the wheel brakes of the vehicle;

a hydraulic power booster connected to said second master cylinder and a source of hydraulic fluid under pressure; and actuator means having a housing with a bore therein, said housing having a first port connected to said first master cylinder for receiving said first hydraulic fluid pressure and a second port connected to said first master cylinder for receiving said second hydraulic fluid pressure, said actuator means having a shuttle piston located in said bore between said first and second ports and a plunger located in said bore and connected to said hydraulic power booster, said shuttle piston remaining stationary when said first hydraulic fluid pressure is equal to or greater than said second hydraulic fluid pressure to allow said first hydraulic fluid pressure to move said plunger and operate said power booster through which said second master cylinder is operated to supply the wheel brakes with an input corresponding to the manual operator input, said shuttle piston moving when said second hydraulic fluid pressure is greater than said first hydraulic fluid pressure to provide said plunger with movement to operate said power booster in response to the operator input and effect a brake application.

2. The brake system as recited in claim 1 further including:

flexible conduit through which said first master cylinder is connected to said actuator means to allow said actuator housing to move with the power booster during the operation of said second master cylinder.

3. The brake system as recited in claim 2 wherein said actuator means further includes stop means located in said bore to limit the movement of said plunger and thereby match the stroke with the movement of first and second pistons in said second master cylinder.

4. The brake system as recited in claim 3 wherein said plunger has a stem that extends into the hydraulic power booster and receives an output signal corresponding to the operation of the hydraulic power booster, said output signal acting on said stem to resist the movement of the plunger by either the first or second hydraulic fluid pressure.

5. The brake system as recited in claim 4 wherein said stop means is of a selected length to permit the alignment of the first and second pistons in the second master cylinder with compensation parts therein.

6. The brake system as recited in claim 5 further including;

a connection between said first and second master cylinders whereby in the absence of a source of hydraulic fluid under pressure to the power booster, the first and second hydraulic fluid pressure from the first master cylinder is directly supplied at the wheel brakes through the second master cylinder to provide for limited braking of the vehicle.

7. The brake system as recited in claim 6 whereby said first and second hydraulic fluid pressure supplied through the second master cylinder aids in reducing the time of response effecting a brake application.

* * * * *